United States Patent Office 3,392,196
Patented July 9, 1968

3,392,196
CATALYTIC METHOD OF PREPARING UNSATURATED ALDEHYDES AND ACIDS
Jamal S. Eden, Akron, Ohio, assignor to The B. F. Goodrich Company, New York, N.Y., a corporation of New York
No Drawing. Original application Jan. 20, 1964, Ser. No. 338,617, now Patent No. 3,228,890, dated Jan. 11, 1966. Divided and this application Aug. 13, 1965, Ser. No. 485,975
10 Claims. (Cl. 260—533)

This is a division of Ser. No. 338,617, now U.S. Patent No. 3,228,890.

This invention relates to a new and useful catalyst and to a method of preparing unsaturated aldehydes and unsaturated carboxylic acids by oxidation of unsaturated hydrocarbons at an elevated temperature and more particularly pertains to a catalyst comprising a mixture of a molybdenum oxide, tellurium oxide and a manganese phosphate in a molar ratio of 100 $MoO_3$, 10–100 $TeO_2$, and 10–100 of a manganese phosphate and to a method of preparing acrolein, methacrolein, acrylic acid or methacrylic acid by passing vapors of propylene or isobutylene and an oxygen containing gas through the catalyst at a temperature of from about 325° C. to about 550° C. The catalyst can also be designated as $$Mo_{10}Te_{1-10}Mn_{2-20}P_{2-20}O_{39-120}$$

with the P being in the form of a phosphate i.e. each P is attached to 3 or 4 oxygen atoms.

Numerous attempts have been made in the past to prepare products of higher oxidation state from hydrocarbons, especially from the normally gaseous hydrocarbons. However, all prior catalysts and procedures for oxidizing monoolefinic gaseous hydrocarbons to monoolefinically unsaturated aldehydes or monoolefinically unsaturated carboxylic acids with the same number of carbon atoms as the hydrocarbon having serious shortcomings. The catalysts either have a very short active life, or they convert only a portion of the hydrocarbon to desired end groups per pass; or they oxidize the hydrocarbon excessively to form high proportions of carbon monoxide or carbon dioxide or both; or they are not sufficiently selective, so that the hydrocarbon molecule is attacked at both the olefinic unsaturation and at a methyl group; or the oxidation of the olefin does not proceed beyond the aldehyde stage.

It is therefore unexpected to find a catalyst that will convert from about 70 to 100% of a gaseous monoolefin such as propylene or isobutylene per pass to yield very high proportions of acrolein, methacrolein and acrylic acid or methacrylic acid. It is also unexpected to find a catalyst that produces a wide ratio of olefinic aldehyde to monoolefinically unsaturated carboxylic acid by controllable changes in reaction conditions or catalyst composition. It is possible to attain mol percent efficiencies of 1.4 to 53 for the aldehyde and 10.8 to 72.1 for the unsaturated carboxylic acid. Usually when the efficiency for conversion of the hydrocarbon to aldehyde is high the efficiency for the conversion to acid is low and vice versa. This provides a great degree of flexibility in the process, so as to provide means for obtaining a product mix that is needed at any particular time during operation.

A further unexpected feature is the unusually long active life of the catalyst.

The oxidation of propylene to the corresponding aldehyde and acid is more effective than the oxidation of isobutylene.

THE REACTANTS

The only essential reactants are (1) propylene or isobutylene and (2) an oxygen containing gas, which can be pure oxygen, oxygen enriched air or air without additional oxygen. For reasons of economy, air is the preferred oxygen containing reactant.

Stoichiometric ratios of oxygen to olefin for the purpose of this invention are 1.5 to 1. Slightly lower amounts of oxygen can be used at a sacrifice of yield.

It is preferred, however, to use 33 to 66% excess oxygen. Larger excess does not impair the yields of aldehydes and acids, but for practical considerations and excess much above 100% would result in the requirement of extremely large equipment for a given production capacity.

The addition of steam into the reactor along with the hydrocarbon and oxygen containing gas is desirable but not absolutely essential. The function of steam is not clear, but it does seem to reduce the amount of carbon monoxide and dioxide in the effluent gases.

Other diluent gases can be used. Surprisingly, saturated hydrocarbons such as propane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported.

It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to dissolve the requisite amount of a molybdenum salt, a tellurium salt and a manganese salt in water. Add the requisite amount of phosphoric acid to the manganese salt solution. Add the tellurium salt solution to the molybdenum salt solution and then add the manganese salt-phosphoric acid mixture to the molybdenum-tellurium salt mixture. The catalyst is then dried and baked at 400° C. for about 16 hours.

Supported catalysts can be prepared by adding a dry support or an aqueous slurry thereof to the aqueous solution of catalyst or the aqueous catalyst ingredients can be added to the slurry of the support.

Alternately a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients and then mix them thoroughly. The main difficulty is to obtain thorough blending and uniform particle size.

Specific procedures for making catalysts are as follows:

I (a) Dissolve 105.96 g. of $(NH_4)_6Mo_7O_{24} \cdot 4H_2O$ in 272 ml. water at 50–55° C.

(b) Dissolve 53.76 g. $NH_4TeO_4$ in 900 ml. water at 50–55° C. and add to the molybdate solution with stirring. The mixture may become cloudy, but no precipitate is formed.

(c) Dissolve 79.19 g. $MnCl_2 \cdot 4H_2O$ in 40 ml. water and add 46.2 g. of 85% $H_3PO_4$ thereto.

Add the mixture described under (c) to the mixture of the ammonium molybdate and ammonium tellurate. No precipitate is formed but the final mixture remains cloudy.

If the catalyst is to remain unsupported, the mixture is evaporated to dryness on a steam bath, heated at 150–200° C. for about an hour and then about 16 hours at 400° C. Then the catalyst is cooled, ground and sieved. For fixed bed systems a 10–18 mesh (U.S. sieve) size is used. For fluid bed systems the catalyst should be 80–325 mesh (U.S. sieve).

If the catalyst is to be supported the aqueous solution of ingredients can be added to an aqueous slurry of the support or vice versa, prior to drying. The procedure after drying is the same as that already described.

Thus, to the aqueous catalyst ingredients 240 g. (1.2 mols) of a colloidal silica (Ludox H.S.) are added slowly with stirring. Stirring is continued for about ½ hour prior to drying.

II

This procedure is a variant of Procedure I.

(a) Prepare a slurry of 43.189 g. $MoO_3$ (99.5% purity).

(b) Make a slurry of 15.961 g. $TeO_2$ (technical) in water and blend with (a) above.

(c) Dissolve 39.584 g. $MnCl_2 \cdot 4H_2O$ in water and add 23.1 g. 85% $H_3PO_4$.

Blend this mixture with the slurry of $MoO_3$ and $TeO_2$. Mix thoroughly and then dry and bake, or, if desired, add 120 g. Ludox H.S. to the catalyst before drying. Ludox H.S. is an aqueous colloidal dispersion of microspheroidal silica in a concentration of 30–35% $SiO_2$.

Another procedure is to add the mixture described under (c) to the Ludox and then add the requisite amount of $TeO_2$ and $MoO_3$ as a slurry.

Also, the ingredients can be added to the Ludox individually if desired.

III

In this procedure the ingredients are precipitated on blending.

(a) Dissolve 105.96 g. of ammonium molybdate in water at about 50° C.

(b) Dissolve 31.922 g. $TeO_2$ in concentrated HCl and filter if necessary.

Add the tellurium salt solution to the ammonium molybdate solution. A precipitate forms.

(c) Dissolve 79.168 g. $MnCl_2 \cdot 4H_2O$ in water and add 46.2 g. of 85% $H_3PO_4$. Add this mixture slowly to the precipitated ammonium molybdate-$TeO_2$ mixture.

Dry on a steam bath and bake for 16 hours at 400° C. Thereafter, the catalyst is ground to the desired mesh size and sieved. For supported catalysts an aqueous slurry can be added to the catalyst ingredients, or vice versa, prior to drying and baking.

IV

The fourth method is to grind $MoO_3$, $TeO_2$ and a manganese phosphate to the proper particle size and then thoroughly mix the dry powders. The mixture can be added to an queous slurry of a support or vice versa and thereafter dried and baked.

The exact chemical structure of the catalysts made by the above procedures is not known, but catalysts with molar ratios of 100 Mo, 10–100 Te and 10–100 of a manganese phosphate can be used for oxidizing the monoolefinic hydrocarbon to aldehyde and/or carboxylic acid. The catalyst contains chemically bound oxygen so that the generic formula can be written as $MoO_3{}_{100}TeO_2{}_{10-100}$ $Mn_2P_2O_7$, or other Mn phosphate$_{10-100}$. The phosphate can be a $PO_4$ radical, a pyrophosphate or a polyphosphate.

Among the suitable supports are silica, silica containing materials, such as diatomaceous earth, kieselguhr, silicon carbide, clay, aluminum oxides and even carbon, although the latter tends to be consumed during the reaction.

The preferred catalyst is one having a ratio of 100 $MoO_3$, 33.25 $TeO_2$ and 33.25 $Mn_2P_2O_7$ because it gives the highest yields of desired products and the preferred support is silica, because of its low cost and good fluidizing characteristics.

REACTION CONDITIONS

The reaction can be carried out in either a fixed or fluidized catalyst bed.

The reaction temperature can range from about 300 to 450° C. for the oxidation of propylene but the preferred range is from about 350 to about 425° C. Below 350° C. the conversion per pass is lower than desirable and low temperature tends to produce more aldehyde than desired. Usually, a longer contact time is needed at lower temperatures to obtain the yields of desired products obtainable at higher temperatures.

Above 425° C. in the propylene oxidation some of the desired end products appear to be oxidized to carbon oxides. This is much more apparent at 450° C. For the isobutylene oxidation temperatures of 375–550 are desirable with the preferred range being 475–525° C.

The molar ratio of oxygen to propylene or isobutylene should be at least 2 to 1 for good conversion and yields, but ratios with some excess oxygen, 33 to 66 mol percent is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide a 33 to 66% excess of oxygen. This range provides the largest proportion of acid, under given reaction conditions. Also, since care is needed to avoid an explosive mixture the limiting of air aids in that direction.

The molar ratio of steam to propylene or isobutylene can range from 0 to about 5, but best results are obtained with molar ratios of about 3.2 to 4.25 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The particle size of catalyst for fixed bed and fluid bed systems has already been described.

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Care is needed to operate at a pressure which is below the dew point pressure of the unsaturated acid at the reaction temperature.

The data in the examples show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions.

The examples are intended to illustrate the invention but not to limit it.

Example I

A series of runs was made in a fixed bed reactor of a high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor.

Outlet vapors were passed through a short water cooled condenser. Uncondensed gases were passed through a gas chromatograph (Perkin-Elmer model 154D) and analyzed continuously. The liquid condensate was weighed and then analyzed for acrylic acid and acrolein in the gas chromatograph.

The reactor was filled to about 90% of its capacity with 170 ml. of a catalyst made by Method IV described above, using a ratio of 100 MoO₃, 33.25 TeO₂ and 33.25 Mn₂P₂O₇. Empirically the catalyst is $$Mo_{100}Te_{33.25}Mn_{66.5}P_{66.5}O_{599.25}$$

and the P is present as P₂O₇. The catalyst was not supported and had a mesh size of 10–18 (U.S. Sieve).

Steam at a temperature of 200–250° C. was first passed into the reactor. Then propylene and air were separately fed into the stream of water vapor. This mixture then passed through a pre-heater and entered the reactor at about 200–250° C. The reactor was pre-heated to about 285° C. before the gas feed was begun.

The ratio of reactants was about 2.955 mols of oxygen and 4.16 mols of steam per mol of propylene. Cold contact time was 54 seconds.

The reaction temperature was varied as the reaction proceeded.

The table below summarizes the data obtained in these runs:

| Run No. | Temp., ° C. | Mol Percent Propylene Converted | Mol Percent Yield on Propylene Converted | | Mol Percent Efficiency | |
|---|---|---|---|---|---|---|
| | | | Acr. | AA | Acr. | AA |
| 1 | 352 | 82.6 | 58.0 | 27.4 | 47.9 | 22.6 |
| 2 | 378 | 98.7 | 39.5 | 46.8 | 39.0 | 45.6 |
| 3 | 395 | 100 | 18.0 | 64.2 | 18.0 | 64.2 |
| 4 | 408 | 100 | 6.1 | 69.4 | 6.1 | 69.4 |
| 5 | 416 | 100 | 3.1 | 72.1 | 3.1 | 72.1 |
| 6 | 425 | 100 | 8.6 | 61.3 | 8.6 | 61.3 |

Acr.=Acrolein; AA=Acrylic Acid.

Repetition of Run 5 showed a yield of 3.3% acrolein and 70.8% acrylic acid.

In this set of experiments the only variable was the reaction temperature. It is apparent that if acrylic acid is the desired end product the reaction should preferably be held at about 405° to 415° C. If acrolein is the desired product lower temperatures of 350° C. or slightly below are preferred. Run No. 2 shows a combined efficiency of 84.5% with a ratio of acrolein to acrylic acid of about 1 to 1.2. Run No. 5 shows unusually good efficiency for acrylic acid production. If acrylic acid is the end product desired with a minimum of acrolein the conditions of this reaction can be followed.

Example II

The catalyst and feed ratios were the same as those described under Example I. The cold contact time was 27 seconds. The reactor was similar to that described in Example I, but it had a length of 6 inches instead of 12. The amount of catalyst used was 85 ml.

A run at 400° C. showed 81.2% conversion of propylene with a mol percent yield, based on propylene converted, of 63 for acrolein and 27.5 for acrylic acid. The respective mol percent efficiencies are 51.1 and 22.4.

Another test made at 422° C. converted 95.4% of the propylene with a mol percent yield of acrolein of 46.3 and acrylic acid of 43.0. The respective mol percent efficiencies are 44.1 and 41.1.

This example shows that by reducing catalyst volume to one half that in Example I and also reducing the contact time 50% excellent efficiencies are obtainable.

Example III

The reactor, catalyst and catalyst volume were identical to those disclosed in Example I. The molar ratio of oxygen (supplied as air) to propylene in all runs was 3 to 1, and the steam-propylene ratio was 4.25 to 1, on a molar basis. Cold contact time in each case was 41 seconds.

The data obtained are recorded below:

| Run No. | Temp., ° C. | Mol Percent Propylene Converted | Mol percent Yield on Propylene Converted | | Mol percent Efficiency | |
|---|---|---|---|---|---|---|
| | | | Acr. | AA | Acr. | AA |
| 1 | 390 | 98.8 | 38.7 | 48.3 | 38.2 | 47.7 |
| 2 | 400 | 100 | 29.8 | 57.9 | 29.8 | 57.9 |
| 3 | 410 | 100 | 14.7 | 64.6 | 14.7 | 64.6 |
| 4 | 422 | 100 | 15.4 | 62.2 | 15.4 | 62.2 |

Run No. 2 shows a combined efficiency of 87.6, which is unusually high in view of the fact that there are numerous competing reactions going on concurrently, including the oxidation of the hydrocarbon to carbon monoxide and carbon dioxide.

Example IV

In order to show the effect of water vapor, a series of tests was made using a feed containing 3 mols of oxygen (supplied as air) per mol of propylene. The reactor, catalyst and catalyst volume were the same as described in Example I.

The data obtained in these runs are shown in the table below:

| Mol H₂O/ Propylene | Contact Time, Sec. | Temp., ° C. | Mol Percent Propylene Converted | Mol Percent Yield on Propylene Converted | |
|---|---|---|---|---|---|
| | | | | Acr. | AA |
| 4.25 | 41 | 410 | 100 | 14.7 | 64.6 |
| 3.2 | 43 | 410 | 100 | 31.6 | 52.2 |
| 2.2 | 45 | 410 | 100 | 30.0 | 50.6 |
| 1.0 | 48 | 405 | 100 | 33.4 | 45.3 |
| 0 | 51 | 415 | 100 | 24.7 | 46.8 |

The mol percent efficiencies for each end product are the same as the yields, because conversion of the propylene was complete in all instances.

The data show that the presence of moisture is desirable but not essential to good yields of end products desired.

Example V

The reactor, catalyst and catalyst volume were the same as described in Example I. The main variable was the difference in the amount of oxygen in the feed gases. Data obtained are tabulated below: The oxygen was supplied as air.

| O₂/C₃H₆ | H₂O/C₃H₆ | Contact Time, Sec. | Temp., ° C. | Mol percent Propylene Converted | Mol percent Yield on Propylene Converted | |
|---|---|---|---|---|---|---|
| | | | | | Acr. | AA |
| 3.0 | 4.2 | 54 | 408 | 100 | 6.1 | 69.4 |
| 2.6 | 4.25 | 47 | 410 | 100 | 22.4 | 58.0 |
| 2.0 | 4.25 | 56 | 405 | 100 | 30.3 | 50.3 |

Example VI

This example shows the use of catalysts with variable compositions. Each catalyst was prepared by Procedure III, detailed above. The amount of catalyst employed was 170 ml. in the 12 inch reactor. In each run the oxygen (fed as air) to propylene ratio was 3 to 1 and 4.25 mols of steam were fed per mol of propylene. The cold contact time was 41 seconds.

| Temp., °C. | Percent Propylene Converted | Mol percent Yield on Propylene Converted | | Mol percent Efficiency | | Mol ratio of Catalyst per 100 mols Mo | |
|---|---|---|---|---|---|---|---|
| | | Acr. | AA | Acr. | AA | TeO$_2$ | Mn$_2$P$_2$O$_7$ |
| 378 | 100 | 3.7 | 49.7 | | | 10 | 25 |
| 405 | 100 | 4.2 | 52.5 | | | | |
| 372 | 94.4 | 50.1 | 33.4 | 47.3 | 31.5 | 25 | 40 |
| 400 | 100 | 25.0 | 49.3 | | | | |
| 415 | 100 | 9.1 | 55.8 | | | | |
| 380 | 93.4 | 52.7 | 32.0 | 49.2 | 29.9 | 40 | 10 |
| 398 | 100 | 40.5 | 45.0 | | | | |
| 408 | 100 | 25.5 | 54.5 | | | | |
| 370 | 94.8 | 37.8 | 32.1 | 35.2 | 30.4 | 13.3 | 13.3 |
| 400 | 100 | 17.5 | 54.0 | | | | |
| 420 | 100 | 12.1 | 55.4 | | | | |
| 390 | 98.8 | 38.7 | 48.3 | 38.2 | 47.7 | 33.25 | 33.25 |
| 400 | 100 | 29.8 | 57.9 | | | | |
| 410 | 100 | 14.7 | 64.6 | | | | |
| 420 | 100 | 15.4 | 62.2 | | | | |
| 370 | 95.2 | 43.2 | 33.5 | 41.2 | 31.8 | | |
| 390 | 100 | 23.7 | 54.5 | | | | |
| 400 | 100 | 5.2 | 70.2 | | | | |
| 355 | 100 | 46.5 | 30.8 | | | 53.2 | 53.2 |
| 375 | 100 | 27.1 | 46.4 | | | | |
| 395 | 100 | 10.2 | 58.2 | | | | |
| 403 | 100 | 8.5 | 61.2 | | | | |
| 389 | 100 | 38.6 | 44.9 | | | 53.2 | 33.25 |
| 405 | 100 | 30.5 | 53.0 | | | | |
| 405 | 100 | 36.2 | 45.2 | | | 33.25 | 19.95 |
| 405 | 100 | 14.2 | 50.9 | | | 33.25 | 66.5 |
| 355 | 96.8 | 38.0 | 31.5 | 36.8 | 30.5 | 20 | 80 |
| 375 | 100 | 21.9 | 45.9 | | | | |
| 405 | 100 | 4.3 | 54.6 | | | | |
| 415 | 100 | 1.4 | 57.2 | | | | |
| 380 | 91.0 | 68.5 | 21.3 | 62.3 | 19.4 | 50 | 20 |
| 400 | 100 | 48.8 | 39.1 | | | | |
| 410 | 100 | 37.7 | 49.0 | | | | |
| 425 | 100 | 28.3 | 54.1 | | | | |
| 350 | 99.2 | 53.4 | 28.4 | 53.0 | 28.2 | 80 | 50 |
| 370 | 100 | 44.2 | 37.0 | | | | |
| 400 | 100 | 10.2 | 64.1 | | | | |
| 410 | 100 | 4.7 | 58.8 | | | | |

The above data show that a range of from 10–80 mols TeO$_2$ and 10–80 mols of a manganese phosphate per 100 mols of molybdenum compound can be employed to obtain good yields of acrolein and acrylic acid from the oxidation of propylene.

Example VII

The runs of this example were made with an unsupported catalyst prepared by dissolving ammonium molybdate and ammonium tellurate in water and blending the two solutions and thereafter adding an aqueous solution of manganese chloride and phosphoric acid. The molar ratio of ingredients was 100 Mo, 33.25 Te and 33.25 Mn$_2$P$_2$O$_7$. For these tests 3 mols of oxygen (supplied as air) per mol of propylene and 4.25 mols of water per mol of propylene were fed into a 12 inch reactor containing 170 ml. of the catalyst. Contact time was 41 seconds in all runs. Data recorded in these tests are tabulated below:

| Temp., °C. | Mol Percent Propylene Converted | Mol Percent Yield on Propylene Converted | | Mol Percent Efficiency | |
|---|---|---|---|---|---|
| | | Acr. | AA | Acr. | AA |
| 350 | 87.7 | 59.5 | 22.5 | 52.2 | 19.7 |
| 375 | 100 | 38.2 | 44.9 | | |
| 400 | 100 | 17.6 | 64.0 | | |
| 410 | 100 | 14.4 | 58.9 | | |
| 430 | 100 | 10.6 | 56.7 | | |

Example VIII

A catalyst was prepared by moistening 129.6 g. of MoO$_3$ (99.5%), adding 47.88 g. TeO$_2$, 42.56 g. MnO and 69.2 g. of 85% H$_3$PO$_4$, in the order named. The mixture was thoroughly blended, dried and heated for 16 hours at 400° C. The catalyst was then ground and screened. Particles with a mesh size of 10–18 (U.S. Sieve) were used. The reactor was 12 inches long. It was charged with 170 ml. of catalyst. The data obtained with this catalyst are summarized below:

| O$_2$/C$_3$H$_6$ | H$_2$O/C$_3$H$_6$ | Contact Time, Sec. | Temp., °C. | Mol Percent Propylene Converted | Mol Percent Yield on Propylene Converted | | Mol Percent Efficiency | |
|---|---|---|---|---|---|---|---|---|
| | | | | | Acr. | AA | Acr. | AA |
| 3.0 | 4.16 | 54 | 405 | 98.2 | 44.8 | 36.1 | 44 | 35.5 |
| 3.0 | 4.25 | 40 | 415 | 95.2 | 46.8 | 31.2 | 44.6 | 29.7 |

Example IX

This example shows results obtained in a fixed bed system with a silica supported catalyst. Catalyst A was prepared by adding the requiste amount of MoO$_3$ (99.5% pure) in aqueous slurry to a colloidal silica (Ludox H.S.) with stirring, then a slurry of TeO$_2$ was added with stirring and finally a solution of MnCl$_2$ in 85% H$_3$PO$_4$ was added. The mixture was stirred, dried, and baked at 400° C. Catalyst B was prepared by making a solution of ammonium molybdate and ammonium tellurate in water and adding this to a colloidal silica which had some added ammonium hydroxide to prevent precipitation of the catalyst ingredients. Then an aqueous solution of MnCl$_2$ and H$_3$PO$_4$ was added. The mixture was stirred well, dried and baked at 400° C. for 16 hours. The reactor used was 6 inches long. It was filled with 85 ml. of catalyst. The molar ratio of ingredients in each catalyst was 100 Mo$_3$, 33.25 TeO$_2$, 33.25 Mn$_2$P$_2$O$_7$, and 200 SiO$_2$.

Data obtained are tabulated below:

| Catalyst A | | Contact Time, Sec. | Temp., °C. | Mol Percent Propylene Converted | Mol percent Yield on Propylene Converted | | Mol Percent Efficiency | |
|---|---|---|---|---|---|---|---|---|
| $O_2/C_3H_6$ | $H_2O/C_3H_6$ | | | | Acr. | AA | Acr. | AA |
| 2.5 | 3.9 | 19 | 350 | 98.3 | 47.8 | 37.2 | 47.0 | 36.6 |
| 2.6 | 4.1 | 24 | 345 | 98.8 | 41.0 | 41.3 | 40.5 | 40.8 |
| 3.0 | 3.9 | 16 | 350 | 94.8 | 50.1 | 33.0 | 47.5 | 31.3 |
| 3.0 | 4.1 | 21 | 350 | 98.9 | 43.4 | 37.6 | 42.9 | 37.1 |
| 3.0 | 4.1 | 27 | 345 | 100 | 32.5 | 43.3 | | |
| 3.0 | 3.3 | 17 | 370 | 95.8 | 55.4 | 32.0 | 53.0 | 30.6 |
| 3.0 | 3.3 | 21 | 372 | 99.2 | 43.6 | 38.7 | 42.2 | 38.4 |
| 3.0 | 4.2 | 27 | 364 | 98.3 | 41.6 | 42.7 | 40.9 | 41.9 |
| Catalyst B | | | | | | | | |
| 3.0 | 4.2 | 27 | 375 | 98.0 | 34.8 | 41.2 | 34.1 | 40.2 |

All the above examples illustrate the use of the new catalysts in fixed bed systems. The following are examples in fluid bed systems. In each instance the catalyst was supported on diatomaceous earth. This support provided superior fluidizing characteristics and provided better yields of desired products than the colloidal silica supported catalysts.

The supported catalyst employed in the fluidized bed was made as follows:

211.92 g. of ammonium molybdate were dissolved in 220 ml. $H_2O$ at 60° C. and 132 g. of diatomaceous earth (Celite V) were added and stirred until thorough blending was obtained.

102.2 g. of $TeO_2$ were dissolved in 216 ml. of warm concentrated HCl and 105 g. of Celite V were added thereto.

To a solution of 158.3 g. of $MnCl_2$ in 140 ml. of water were added 92.4 g. of 85% $H_3PO_4$ (aqueous) and 105 g. Celite V were added to the mixture.

The tellurium oxide-HCl mixture was added to the mixture containing the manganese salt and blended thoroughly and the ammonium molybdate-Celite mixture was added last. The mixture was dried and baked at 400° C.

Celite V is a diatomaceous earth in granular form, with minor cristobalite structure. It has a bulk density of .39 g./cc., a skeletal density of 2.2 g./cc. determined in water, a surface area of 3-6 sq. meters/g. and an average water absorption capacity of 90 g./100 g. of Celite.

The unsupported catalyst was made by Procedure III described above.

In these runs the reactor was a high silica glass cylinder with an O.D. of 38 mm. and height of 5 ft. It was filled to a height of 10.5 inches for the unsupported catalyst and to a height of 24 inches for the supported catalyst. In all cases the catalyst was fluidized by first injecting hot air into the reactor and then adding the requisite amounts of steam and propylene. The gases were preheated to about 250° C. prior to entering the reactor. The reactor was heated externally with electrical resistance wire, and the reaction temperature was controlled by use of rheostats to regulate the flow of current through the electrical heating wires.

The data obtained in the runs are given below:

UNSUPPORTED CATALYST

| $O_2/C_3H_6$ | $H_2O/C_3H_6$ | Contact Time, Sec. | Temp., °C. | Mol Percent Conversion Propylene | Mol Percent Yield on Propylene Converted | |
|---|---|---|---|---|---|---|
| | | | | | Acr. | AA |
| 2.7 | 4.5 | 8 | 375 | 67.2 | 60.9 | 22.8 |
| 2.6 | 4.4 | 15.4 | 375 | 89.2 | 40.3 | 30.6 |
| 2.7 | 4.6 | 14.1 | 350 | 68.7 | 65.4 | 17.1 |
| 2.6 | 4.4 | 20.2 | 375 | 96.7 | 38.5 | 32.8 |
| 2.5 | 4.1 | 20.6 | 400 | 100 | 18.8 | 49.5 |
| 2.6 | 4.3 | 20 | 350 | 79.7 | 34.0 | 25.6 |
| 2.5 | 4.3 | 24.2 | 375 | 98.5 | 31.4 | 44.1 |
| 2.9 | 4.7 | 22.9 | 400 | 100 | 14.4 | 53.1 |
| 2.6 | 4.4 | 23.6 | 400 | 100 | 15.0 | 51.4 |
| 2.8 | 5.0 | 19.2 | 400 | 100 | 20.0 | 49.9 |

SUPPORTED CATALYST

| 2.7 | 3.7 | 18 | 400 | 97.9 | 38.3 | 29.7 |
| 2.6 | 2.9 | 28 | 400 | 100 | 28.9 | 36.8 |
| 2.5 | 2.7 | 40.8 | 400 | 100 | 15.9 | 44.8 |
| 2.6 | 2.7 | 40.6 | 385 | 100 | 24.2 | 46.0 |

Each of these catalysts was run for well over 100 hours without any apparent decrease in activity, even though reaction conditions in various runs were altered considerably.

The remaining examples were run in a fixed bed system.

Example X

In this example two different catalysts were used, A had a molar ratio of 100 $MoO_3$, 33.25 $TeO_2$ and 33.25 of $Mn_3(PO_4)_2$ and B had a molar ratio of 100 $MoO_3$, 33.25 $TeO_2$ and 13.3 $Mn_5(P_3O_{10})_2$.

CATALYST A

| $O_2/C_3H_3$ | $H_2O/C_3H_6$ | Contact Time, Sec. | Temp., °C. | Mol Percent Propylene Converted | Mol Percent Yield on Propylene Converted | | Mol Percent Efficiency | |
|---|---|---|---|---|---|---|---|---|
| | | | | | Acr. | AA | Acr. | AA |
| 3 | 4.2 | 54 | 360 | 97.1 | 43.8 | 37.8 | 42.5 | 36.8 |
| 3 | 4.2 | 54 | 380 | 100 | 24.7 | 48.6 | | |
| 3 | 4.2 | 54 | 400 | 100 | 8.5 | 51.4 | | |

CATALYST B

| 3 | 4.2 | 54 | 365 | 50.6 | 63.5 | 7.9 | 32.1 | 4.0 |
| 3 | 4.2 | 54 | 390 | 82.4 | 56.5 | 15.6 | 46.4 | 12.8 |
| 3 | 4.2 | 54 | 420 | 99.2 | 42.0 | 30.0 | 41.7 | 29.7 |

Example XI

In this example isobutylene was used as the olefin. The results show that the most desirable temperature for the oxidation of this olefin to methacrolein and methacrylic acid is higher than that for the oxidation of propylene, and also that the isobutylene is somewhat more resistant to oxidation than propylene, because it requires drastic conditions to obtain a high conversion of the olefin. Also, the yields and efficiencies for isobutylene oxidation are not as good as those obtained with propylene.

The data below show results obtained with the catalyst at two different volumes.

170 ML. CATALYST VOLUME

| $O_2/C_4H_8$ | $H_2O/C_4H_8$ | Contact Time, Sec. | Temp., °C. | Percent Isobutylene Converted | Mol percent Yield on Isobutylene Converted | | Mol percent Efficiency | |
|---|---|---|---|---|---|---|---|---|
| | | | | | Aldehyde | Acid | Aldehyde | Acid |
| 1.9 | 3.8 | 51 | 395 | 36.7 | 39.2 | 9.8 | 14.3 | 3.9 |
| 2.4 | 3.8 | 43 | 435 | 70.1 | 43.8 | 6.3 | 30.7 | 4.4 |

85 ML. CATALYST VOLUME

| | | | | | | | | |
|---|---|---|---|---|---|---|---|---|
| 2.0 | 4.3 | 23 | 480 | 77.9 | 55.8 | 6.0 | 43.5 | 4.7 |
| 2.8 | 3.7 | 19 | 535 | 99.1 | 27.1 | 4.7 | 26.9 | 4.6 |
| 3.0 | 3.9 | 25 | 480 | 90.3 | 31.4 | 4.4 | 28.3 | 4.0 |

The catalyst had a molar ratio of 100 $MoO_3$, 25 $TeO_2$ and 25 $Mn_2P_2O_7$.

Example XII

An unsupported catalyst made by Procedure III, using molar ratios of ingredients such that the $MoO_3$, $TeO_2$ and $Mn_2P_2O_7$ was 1:1:1, was placed in the 12 inch fixed bed reactor hereinbefore described. The reaction mixture consisted of 1 mol of propylene, about 3 mols of oxygen, supplied as air, and 4.2 mols of water vapor. The reaction temperature was 390° C. and the cold contact time was 54 seconds. All of the propylene was consumed, with a yield of 3.0% acrolein and 61.5% of acrylic acid.

For the purpose of this invention the hydrocarbons which are oxidized can be defined generically by the formula

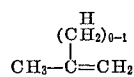

wherein it is also apparent that the end products formed result from the oxidation of only one methyl group on the hydrocarbon molecule while the terminal $CH_2\!=\!C\!<$ remains intact.

It is apparent to those skilled in the art that there are many variations in respect of catalyst, catalyst concentration, and reactant ratios that can be employed and that the invention shall not be limited except by the claims.

The method of impregnating a silicic carrier with individual ingredients of the catalyst system and thereafter combining the so impregnated carriers to complete the catalyst preparation is disclosed and claimed in patent application No. 380,683, filed July 6, 1964 in the name of T. L. Kang.

I claim:

1. A method of preparing a mixture of unsubstituted monoolefinic aldehydes and monoolefinic monocarboxylic acids by oxidation of a methyl group of a hydrocarbon having the structure

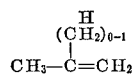

comprising passing through a catalyst bed a mixture of gases having a molar ratio of 1 mol of said monoolefinic hydrocarbon, an oxygen containing gas containing 1.5 to 4 mols of oxygen and up to 7 mols of water vapor per mol of said monoolefinic hydrocarbon, at a temperature of from about 325° C. to about 500° C., the said catalyst consisting essentially, on a molar basis, of $Mo_{10}Te_{1-10}Mn_{2-20}P_{2-20}O_{39-120}$ in which each P is combined with 3 to 4 atoms of oxygen and the Mn to P ratio ranges from 5Mn to 6P to 3Mn to 2P.

2. A method of preparing a mixture of claim 1 for acrolein and acrylic acid comprising passing a mixture of propylene, and an oxygen containing gas containing from about 1.5 to 4 mols of oxygen per mol of propylene through a bed of a catalyst having the empirical formula $Mo_{10}Te_{1-10}Mn_{2-20}P_{2-20}O_{39-120}$ in which each P atom is combined with 3 to 4 atoms of oxygen and the Mn to P ratio ranges from 5Mn to 6P to 3Mn to 2P, at a temperature of from about 350° C. to about 450° C.

3. The method of claim 2 in which the Mn to P ratio is 1.

4. The method of claim 2 in which the catalyst has the empirical formula $Mo_{100}Te_{33.25}Mn_{66.5}P_{66.5}O_{599.25}$ and the P is present as $P_2O_7$.

5. A method of claim 2 for preparing a mixture of acrolein and acrylic acid comprising passing a mixture of propylene, an oxygen containing gas containing from about 1.5 mols of oxygen per mol of propylene and up to 7 mols of water vapor per mol of propylene through a bed of a catalyst comprising $$Mo_{100}Te_{33.25}Mn_{66.5}P_{66.5}O_{599.25}$$

from about 360 to about 425° C.

6. A method of claim 1 for preparing a mixture of methacrolein and methacrylic acid comprising passing a mixture of isobutylene and an oxygen containing gas in an amount sufficient to provide from about 1.5 to about 3 mols of oxygen per mol of isobutylene, through a bed of a catalyst comprising $Mo_{10}Te_{1-10}Mn_{2-20}P_{2-20}O_{39-120}$ in which the Mn to P ratio ranges from $Mn_5$ to $P_6$ to $Mn_3$ to $P_2$, and in which each P is combined with 3 to 4 atoms of oxygen.

7. The method of claim 6 in which from about 1 to about 7 mols of water vapor per mol of isobutylene are included in the mixture which is passed through the catalyst.

8. The method of claim 6 in which the catalyst is $Mo_{100}Te_{33.25}Mn_{66.25}P_{66.25}O_{599.25}$ in which the P is present as a phosphate.

9. A method for preparing a mixture of unsaturated monoolefinic aldehydes and monoolefinic monocarboxylic acids comprising contacting a hydrocarbon selected from the group consisting of propylene and isobutylene, and oxygen, in a molar ratio of one mol of hydrocarbon and 1.5 to 4 mols of oxygen at a temperature from about 325° to 500° C., with a catalyst comprising, in molar ratio, 100 $MoO_3$, 10–100 $TeO_2$ and 10–100 of a manganese phosphate.

10. The method of claim 9 wherein the hydrocarbon is propylene, the manganese phosphate is manganese pyrophosphate, the temperature is about 350 to about 425° C., the molar ratio of oxygen to propylene is at least 2:1 present in air and there is also present from 0 to about 5 mols of steam per mol of propylene.

References Cited
UNITED STATES PATENTS
2,649,477    8/1953    Jacobs et al.    260—533
3,192,259    6/1965    Fetterly et al.    260—533

FOREIGN PATENTS
839,808    6/1960    Great Britain.

HENRY R. JILES, *Primary Examiner.*

LORRAINE A. WEINBERGER, RICHARD K. JACKSON, *Examiners.*

D. E. STENZEL, S. B. WILLIAMS, *Assistant Examiners.*

UNITED STATES PATENT OFFICE
CERTIFICATE OF CORRECTION

Patent No. 3,392,196                                        July 9, 1968

Jamal S. Eden

It is certified that error appears in the above identified patent and that said Letters Patent are hereby corrected as shown below:

Column 2, line 12, "and", second occurrence, should read -- an --. Column 5, in the table, first column, line 5 thereof, "416" should read -- 415 --. Columns 7 and 8, in the table, first column, line 23 thereof, "389" should read -- 398 --. Column 8, line 61, "requiste" should read -- requisite --. Colum 12, line 44, after the formula, insert -- in which the P is present as $P_2O_7$ at a temperature of --.

Signed and sealed this 16th day of December 1969.

(SEAL)

Attest:

Edward M. Fletcher, Jr.                               WILLIAM E. SCHUYLER, JR.

Attesting Officer                                                  Commissioner of Patents